US011365813B2

(12) United States Patent
Sybrowsky

(10) Patent No.: US 11,365,813 B2
(45) Date of Patent: Jun. 21, 2022

(54) DEVICE FOR SELECTIVELY STORING AND MIXING FIRST AND SECOND LIQUIDS

(71) Applicant: Creative Cosmetic Concepts, LLC, Indianapolis, IN (US)

(72) Inventor: Joshua B. Sybrowsky, Lincoln, CA (US)

(73) Assignee: Creative Cosmetic Concepts, LLC, Indianapolis, IN (US)

( * ) Notice: Subject to any disclaimer, the term of this patent is extended or adjusted under 35 U.S.C. 154(b) by 456 days.

(21) Appl. No.: 16/654,935

(22) Filed: Oct. 16, 2019

(65) Prior Publication Data

US 2021/0116036 A1   Apr. 22, 2021

(51) Int. Cl.
| A46B 11/04 | (2006.01) |
| F16K 1/22 | (2006.01) |
| A45D 19/02 | (2006.01) |
| A46B 11/00 | (2006.01) |
| B65D 81/32 | (2006.01) |
| B65D 47/42 | (2006.01) |
| A45D 19/00 | (2006.01) |

(52) U.S. Cl.
CPC .............. *F16K 1/221* (2013.01); *A45D 19/02* (2013.01); *A46B 11/0041* (2013.01); *B65D 47/42* (2013.01); *B65D 81/32* (2013.01); *A45D 19/0066* (2021.01); *A45D 2200/058* (2013.01)

(58) Field of Classification Search
CPC ......... B65D 81/32; B65D 47/42; F16K 1/221; A45D 19/02; A46B 11/0041
See application file for complete search history.

(56) References Cited

U.S. PATENT DOCUMENTS 10,667,592 B2 *   6/2020   Gayton ................. B01F 35/187

* cited by examiner

*Primary Examiner* — Jennifer C Chiang
(74) *Attorney, Agent, or Firm* — Ice Miller LLP

(57) ABSTRACT

A device for selectively storing and mixing two liquids. The device comprises a first interior portion for storing a first liquid, a second interior portion for storing a second liquid, and a valve intermediate to the first and second interior portions. The valve moves between at least two positions, a first position preventing the first and second liquids from mixing, and a second position allowing the first and second liquids to mix. The valve includes a first member protruding from a first side and a second member protruding from a second side.

29 Claims, 6 Drawing Sheets

DEVICE FOR SELECTIVELY STORING AND MIXING FIRST AND SECOND LIQUIDS

TECHNICAL FIELD OF THE DISCLOSED EMBODIMENTS

The embodiments disclosed herein generally relate to a device for storing liquid and, more specifically, to a device for selectively storing and mixing first and second liquids.

BACKGROUND OF THE DISCLOSED EMBODIMENTS

There are many applications where it is desirable to store two different liquids so that they do not come into contact with one another, and later (often just prior to use) mix the two liquids together. One embodiment of such an application is a two part epoxy adhesive. Another example is a two part hair color.

Hair coloring is a commonly used substance, which is considered to provide more fashionable or desirable looks for the user. A number of different types of hair coloring are known, among which temporary hair color, semi-permanent hair color, demi-permanent hair color, and permanent hair color are the most common types. Temporary hair color can be obtained through rinses, shampoos, gels, sprays, and foams and lasts only from one shampoo to the next because color particles are deposited on the outside of the hair shaft. Semi-permanent hair color contains no or very low levels of developer, peroxide or ammonia, and the color usually lasts up to 4-5 shampoos because the pigment molecules can partially penetrate the hair shaft. Demi-permanent hair color contains a developer and an alkaline agent other than ammonia, and the color typically lasts up to 20-28 shampoos. Permanent hair color contains an alkalizing agent ammonia and a developer, the concentration of which is higher than the concentration of developer used in demi-permanent hair color. The permanent hair color will not wash out and is the only way to dye dark hair into a lighter shade.

A developer as used in demi-permanent hair color and permanent hair color is an oxidizing agent that opens the cuticle to allow the color to penetrate the cuticle layer. Typically, hydrogen peroxide is used as a developer.

Typically in the market of hair coloring chemicals, an individual needs to follow steps to open, combine, mix, and then apply the activated colorant to their hair. One mistake taints the color, making the results other than what is desired. The mixture must be done within an accuracy of 95% or higher to result in the desired color, which is hard to achieve.

In this and other applications, there is therefore a need to make the process of mixing two liquids together simple for the user and also makes the mixing results more precise. The presently disclosed embodiments are directed toward meeting these needs.

SUMMARY OF THE DISCLOSED EMBODIMENTS

In one embodiment, a device constructed and arranged for selectively storing and mixing a first liquid and a second liquid is disclosed. The device comprises a housing, the housing comprising a wall defining an interior volume; and a valve. The valve comprises a valve body. The valve body comprises a circumferential valve outer edge extending between a valve first side, and a valve second side; the valve outer edge defining a valve outer edge circumference.

The valve comprises a first valve positioning member, and a second valve positioning member. The first valve positioning member protrudes from the first side; the first valve positioning member having a first valve positioning member first position when no external forces are acting upon the first valve positioning member. At least a portion of the first valve positioning member extends outside of the valve outer edge circumference when the first valve positioning member is in the first valve positioning member first position. The second valve positioning member protrudes from the second side; the second valve positioning member having a second valve positioning member first position when no external forces are acting upon the second valve positioning member. At least a portion of the second valve positioning member extends outside of the valve outer edge circumference when the second valve positioning member is in the second valve positioning member first position.

The valve is positioned within the interior volume inside of the housing and is constructed and arranged to rotate from a closed position, in which the valve outer edge seats against the wall along the entire valve outer edge circumference, and an open position in which at least a portion of the valve outer edge is not in contact with the wall. When the valve is in the closed position the valve defines a first interior portion within the interior volume adjacent the first side of the valve and a second interior portion within the interior volume adjacent the second side of the valve. In the closed position, interaction between the wall and the first valve positioning member causes the first valve positioning member to move to a first valve positioning member second position. When in the first valve positioning member second position, the first valve positioning member exerts a first force upon the wall while trying to return to the first valve positioning member first position. In the closed position, interaction between the wall and the second valve positioning member causes the second valve positioning member to move to a second valve positioning member second position. When in the second valve positioning member second position, the second valve positioning member exerts a second force upon the wall while trying to return to the second valve positioning member first position.

While in the closed position, the valve is constructed and arranged such that external manipulation of the housing in a region of the valve causes rotation of the valve from the closed position to the open position; and the first valve positioning member moves to the first valve positioning member first position, and the second valve positioning member moves to the second valve positioning member first position.

In another embodiment, an apparatus is disclosed, the apparatus comprising: a valve, comprising: a valve body comprising a circumferential valve outer edge extending between a valve first side and a valve second side, the valve outer edge defining a valve outer edge circumference; a first valve positioning member protruding from the first side, the first valve positioning member having a first valve positioning member first position when no external forces are acting upon the first valve positioning member, wherein at least a portion of the first valve positioning member extends outside of the valve outer edge circumference when the first valve positioning member is in the first valve positioning member first position; and a second valve positioning member protruding from the second side, the second valve positioning member having a second valve positioning member first position when no external forces are acting upon the second valve positioning member, wherein at least a portion of the second valve positioning member extends outside of the valve outer edge circumference when the second valve positioning member is in the second valve positioning member first position.

Other embodiments are also disclosed.

BRIEF DESCRIPTION OF DRAWINGS

The present invention will become more fully understood from the detailed description and the accompanying drawings, wherein.

DETAILED DESCRIPTION OF THE DISCLOSED EMBODIMENTS

Figure 1:
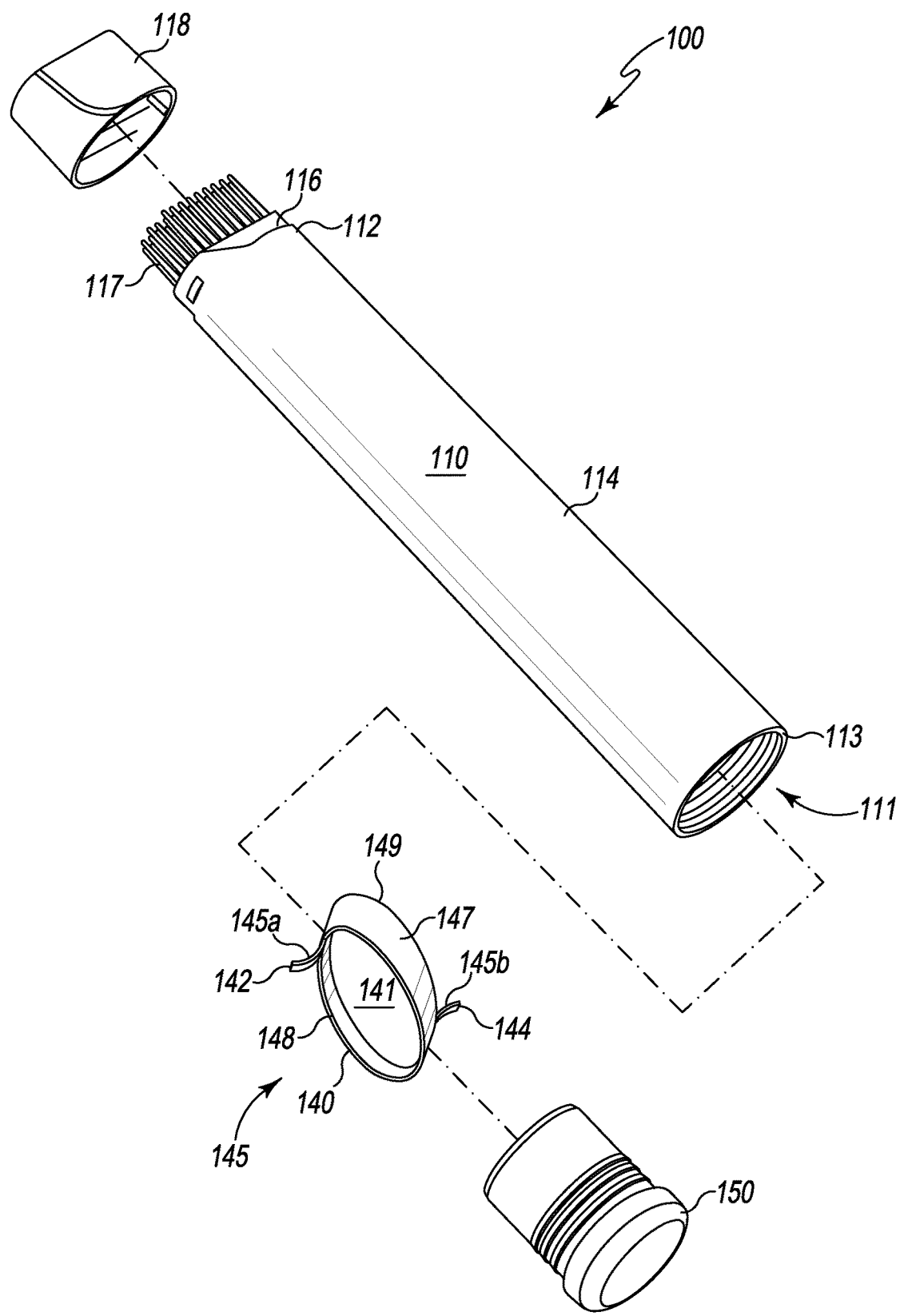
FIG. 1 illustrates an exploded view of a device for selectively storing and mixing first and second liquids formed in accordance with an embodiment.

For the purposes of promoting an understanding of the principles of the invention, reference will now be made to the embodiments illustrated in the drawings, and specific language will be used to describe those embodiments. It will nevertheless be understood that no limitation of the scope of the invention is intended. Alterations and modifications in the illustrated device, and further applications of the principles of the invention as illustrated therein, as would normally occur to one skilled in the art to which the invention relates are contemplated and desired to be protected. Such alternative embodiments require certain adaptations to the embodiments discussed herein that would be obvious to those skilled in the art.

FIGS. 1-6 illustrate embodiments of the present invention directed to a device for selectively storing and mixing first and second liquids. Although the illustrated embodiments are discussed herein for convenience in terms of a device and method for mixing and applying hair coloring chemicals to a person's hair, those skilled in the art will recognize that the devices and methods disclosed herein will find useful application in a variety of applications where it is desired to store two liquids separately and then mix them together at a later time. Additionally, various embodiments of a valve are disclosed herein that will find many applications in addition to selectively storing and mixing two liquids.

Figure 2:
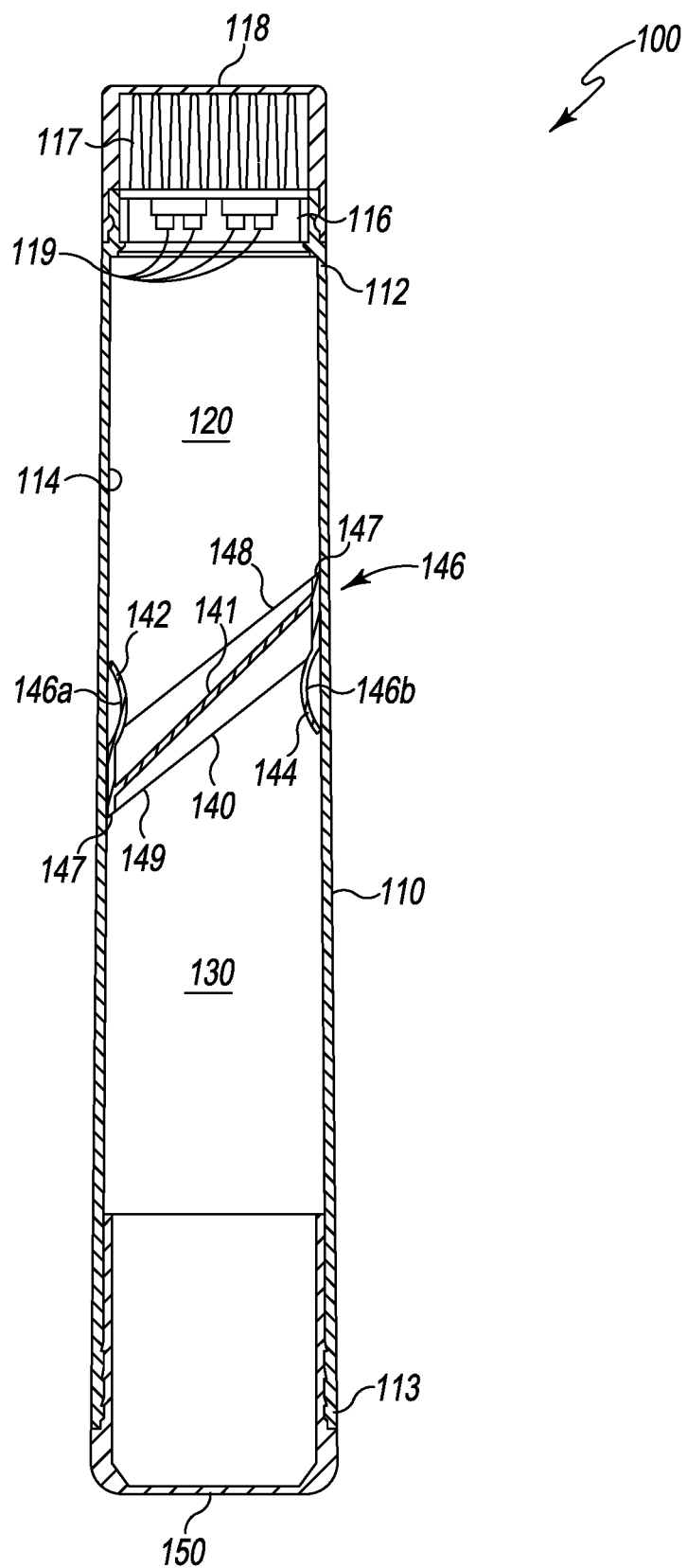
FIG. 2 illustrates an assembled cross-sectional view of the device as shown in FIG. 1, with a valve in a closed position.
Figure 3:
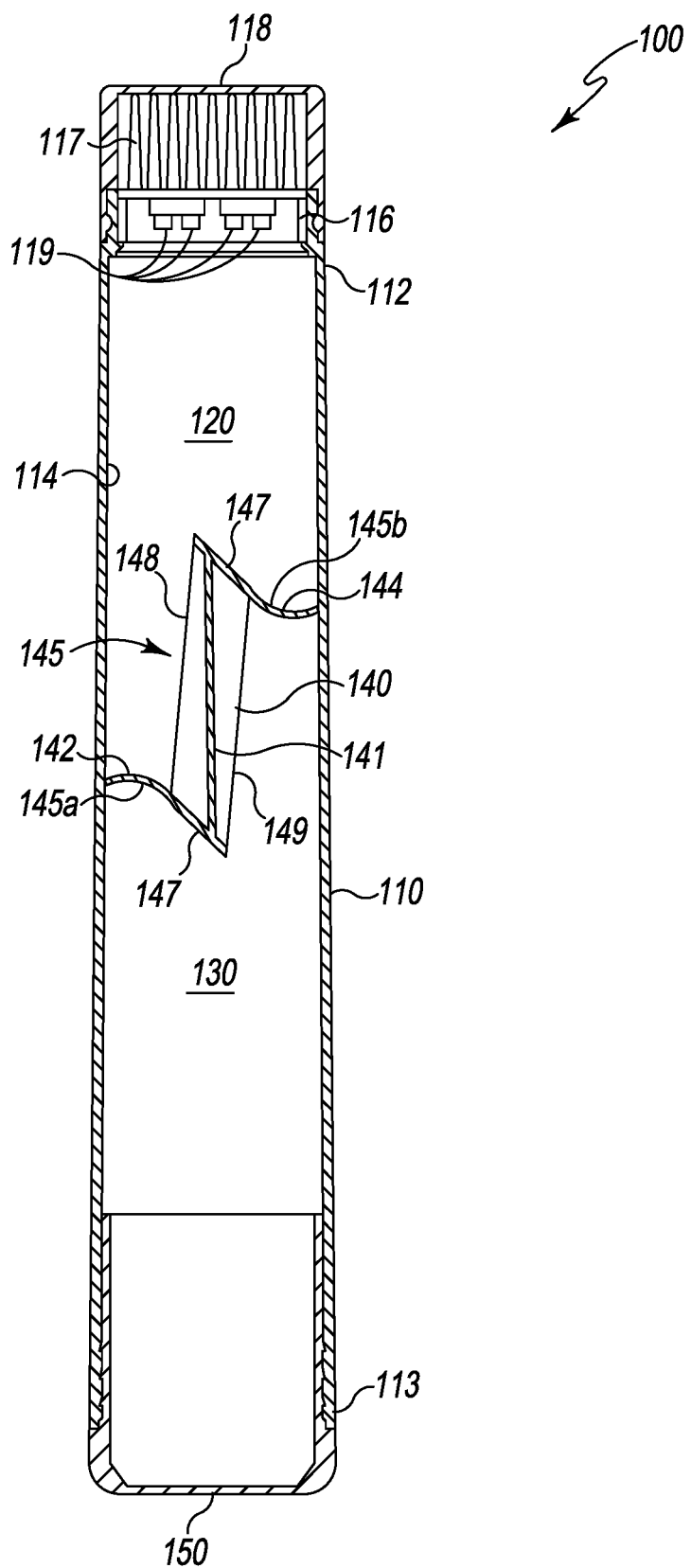
FIG. 3 illustrates an assembled cross-sectional view of the device as shown in FIG. 1, with the valve in an open position.

With reference to FIGS. 1-3, there is illustrated one embodiment of a device 100 useful for storing, mixing and applying hair coloring chemicals to a person's hair. The device 100 may comprise a housing 110 defining an interior volume 111 and a valve 140. The housing may comprise a wall 114, a first end 112, a second end 113, a first cap 118, and a second cap 150. The valve 140 may comprise a valve body 141, the valve body 141 may comprise a circumferential valve outer edge 147 defining a valve outer edge circumference, a valve first side 148, a valve second side 149, a first valve positioning member 142, and a second valve positioning member 144.

As used herein, the first end 112 and second end 113 shall not be limited to describe the top and bottom of device 100 or vice versa. In some embodiments, the first end 112 may include an applicator 116 removably or permanently attached to, or integrally formed with, wall 114. The second end 113 may include the second cap 150 removably or permanently attached to, or integrally formed with, the wall 114. The applicator 116 may include one or more passages 119 formed therethrough to allow the hair coloring chemicals to be dispensed from the device 100. The applicator 116 may include a brush portion 117. The first cap 118 may be used to cover the applicator 116 when not in use.

The valve body circumferential valve outer edge 147 may extend between valve first side 148 and valve second side 149, the circumferential valve outer edge 147 defining a valve outer edge circumference. The first valve positioning member 142 may protrude from the valve first side 148. The first valve positioning member 142 may have a first valve positioning member first position 145a when no external forces are acting upon the first valve positioning member 142. At least a portion of the first valve positioning member 142 may extend outside of the valve outer edge 147 circumference when the first valve positioning member 142 is in the first valve positioning member first position 145a.

The second valve positioning member 144 may protrude from the valve second side 149. The second valve positioning member 144 may have a second valve positioning member first position 145b when no external forces are acting upon the second valve positioning member 144. At least a portion of the second valve positioning member 144 may extend outside of the valve outer edge 147 circumference when the second valve positioning member 144 is in the second valve positioning member first position 145b.

The valve 140 may be positioned within the interior volume 111 of the housing 110 and may be constructed and arranged to rotate from a closed position 146 (as shown in FIG. 2) in which the valve outer edge 147 seats against the wall 114 along the entire valve outer edge 147 circumference. When the valve 140 is in the open position 145 (as shown in FIG. 3) at least a portion of the valve outer edge 147 is not in contact with the wall 114.

In the closed position 146 inside the housing 110 the valve 140 may define a first interior portion 120 within the interior volume 111 adjacent the valve first side 148, and a second interior portion 130 within the interior volume 111 adjacent the valve second side 149. In the closed position 146 an interaction between the wall 114 and the first valve positioning member 142 may cause the first valve positioning member 142 to move to a first valve positioning member second position 146a. When in the first valve positioning member second position 146a, the first valve positioning member 142 may exert a first force upon the wall 114 while trying to return to the first valve positioning member first position 145a.

In the closed position 146, an interaction between the wall 114 and the second valve positioning member 144 may cause the second valve positioning member 144 to move to a second valve positioning member second position 146b. When in the second valve positioning member second position 146b, the second valve positioning member 144 may exert a second force upon the wall 114 while trying to return to the second valve positioning member first position 145b. While the valve 140 is in the closed position 146, external manipulation of the housing 110 in a region of the valve 140 may cause rotation of the valve 140 from the closed position 146 to the open position 145, and the first valve positioning member 142 may move to the first valve positioning member first position 145a, and the second valve positioning member 144 may move to the second valve positioning member first position 145b. Such external manipulation can take many forms, such as applying external pressure to the housing 110 or squeezing the housing 110, to name just two non-limiting examples.

The first and second valve positioning members 142, 144 may abut the wall 114 enclosing the interior volume 111 intermediate to the first and second interior portions 120, 130 while the valve 140 is in the closed position 146. First and second interior portions 120, 130 may have substantially equal volumes in some embodiments, and substantially different volumes in other embodiments.

The first and second valve positioning members 142, 144 may prevent the valve 140 from returning to the closed position 146 after being actuated into the open positon 145. The first and second valve positioning members 142, 144 may be constructed and arranged to spring back to their respective first positions 145a, 145b, arching outside of the valve outer edge 147 circumference of the valve body 141 in the open position 145. It will be appreciated that other mechanisms to prevent the valve 140 from moving from the open position to the closed position may be used instead of the illustrated first and second valve positioning members 142, 144.

The valve 140 in the closed position 146 may prevent a first hair coloring chemical inside the first interior portion 120 from mixing with a second hair coloring chemical inside the second interior portion 130. The valve 140 in the open position 145 may allow the first hair coloring chemical in the first interior portion 120 to mix with the second hair coloring chemical in the second interior portion 130. The valve 140 in the closed positon 146 may form a seal between the valve outer edge 147 of the valve body 141 and the wall 114, thereby defining the interior portions 120, 130 of the housing 110, and preventing mixing of the first and second hair coloring chemicals. The hair coloring chemicals can be developers, oxidizing agents and/or hair colors or dyes. For example, the first hair coloring chemical can be a developer or oxidizing agent and the second hair coloring chemical may be a color, or vice versa.

The valve 140 may be a cylindrical segment bounded by two parallel planes angled 45 degrees from the axis of the cylinder. In other embodiments, the planes may be angled less than or greater than 45 degrees from the axis of the cylinder. In a static state outside of housing 110, both the first valve positioning member 142 and the second valve positioning member 144 may arch away from the outer edge circumference 147 of valve 140, such that first and second valve positioning members 142, 144 extends outside of the circumference of the valve 140 cylindrical segment. The valve 140 and the valve positioning members 142, 144, may be made out of polypropylene (PP) in one embodiment, which bends and while in a bent state may act like a spring as the material wants to return to its molded shape, as illustrated in FIG. 1.

The device 100 may include small reference geometries for the valve 140 to set in place inside of the housing 110. When valve 140 is inserted inside housing 110 and positioned into a closed position 146 with the outer edge 147 circumference contacting the inner surface 114 of housing 110, the valve positioning members 142, 144 may be forced to bend inside of the outer edge circumference 147, as illustrated in FIG. 2, which may form a seal between the outer edge 147 of valve 140 and the wall 114 of housing 110 (the wall 114 acting as the valve seat), when the valve 140 is inside of the housing 110. In this position, the valve 140 longitudinal axis forms an approximately 45 degree angle with the longitudinal axis of the housing 110. It will be appreciated that the angle formed between the valve 140 longitudinal axis and the longitudinal axis of the housing 110 depends upon the angle formed between the two parallel planes defining the cylindrical segment of the valve 140 and the axis of the cylinder from which the cylindrical segment is formed. In this position, the valve positioning members 142, 144 want to return to their natural position as illustrated in FIGS. 1 and 3.

The spring force of the valve positioning members 142, 144 isn't strong enough to cause any movement of the valve 140 with respect to the housing 110 without user actuation. Such user actuation may be achieved by external manipulation of the exterior of the housing 110 in the region of the valve 140, thereby rotating the valve 140 and displacing the valve outer edge 147 away from the wall 114 of the housing 110 at the locations where the squeezing forces are applied, thus breaking the seal formed between the valve outer edge 147 of valve 140 and the wall 114 of housing 110. Once the valve 140 begins to rotate, the valve positioning members 142, 144 push out of the closed position 146, and settle into the open position 145. With the valve positioning members 142, 144 bent into the closed position 146, their spring force is directed toward movement to the open position 145, which is their natural relaxed state. The valve 140, once moved into an open position 145, cannot move back to the closed position 146 because the valve positioning members 142, 144 prevent this once they have returned to their natural state.

Most components of the device 100, such as the housing 110, applicator 116, first cap 118, and second cap 150 may be comprised of commodity thermoplastics and can be made by injection molding, to name just one non-limiting example. The aforementioned components may be made of a material that is substantially chemically resistant and suitable for holding the desired liquids, such as a hair coloring chemical making skin contact under FDA standard, to name just one non-limiting example. For example, the aforementioned components may be made of polypropylene (PP), polyurethane (PU), thermoplastic elastomers (TPE), polyethylene terephthalate, high-impact poly styrene (HIPS), high-density polyethylene (HDPE), polycarbonate, polyvinyl chloride, acrylonitrile butadiene styrene (ABS), and PP-TPE blends, such as an 85% PP-25% TPE blend, to name just a few non-limiting examples. The aforementioned components may be made of any type of material or plastic so long as they provide resistance to the stored liquids and are safe for human use. Most of the components, such as those made of thermoplastics, can also be made by extrusion, blow-molding, or stretch molding.

The device 100 should not be limited in scope to the specific embodiments illustrated herein. The device 100 can be made in multiple sizes, shapes, and hold different amounts of fluid. As a non-limiting example, the device 100 may have a cylindrical shape.

Figure 4:
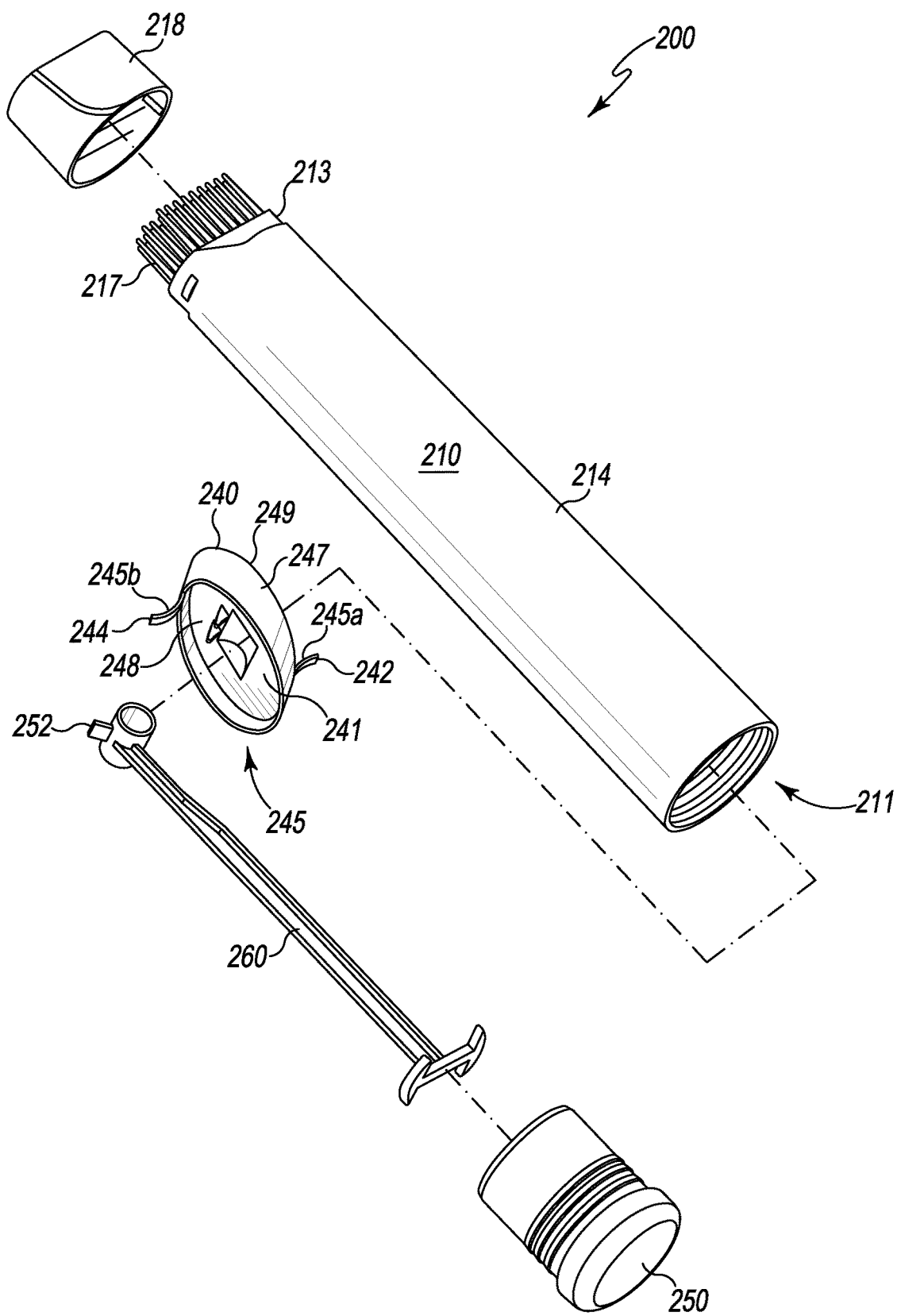
FIG. 4 illustrates an exploded view of a device for selectively storing and mixing first and second liquids formed in accordance with an embodiment.
Figure 5:
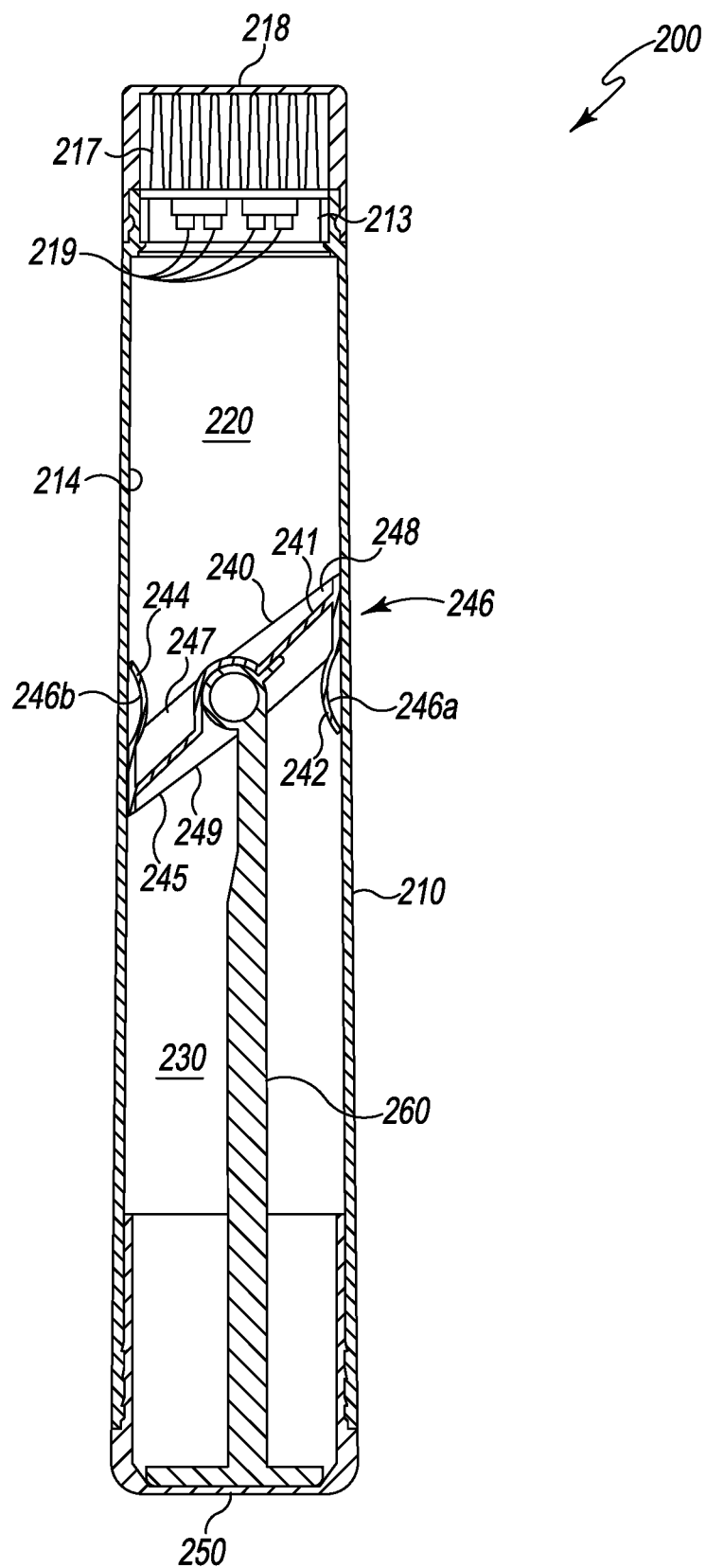
FIG. 5 illustrates an assembled cross-sectional view of the device as shown in FIG. 4, with a valve in a closed position.
Figure 6:
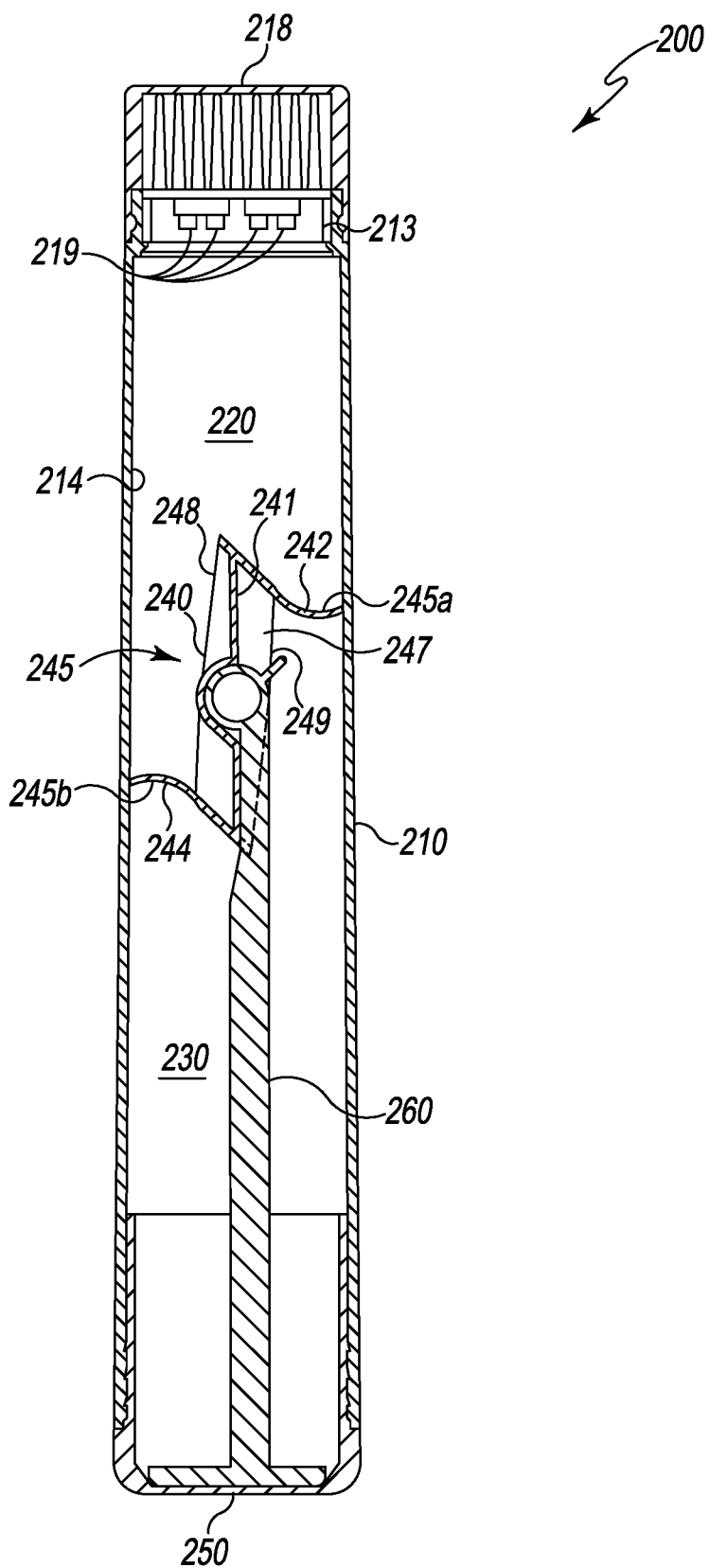
FIG. 6 illustrates an assembled cross-sectional view of the device as shown in FIG. 4, with the valve in an open position.

In another embodiment, as illustrated in FIGS. 4-6, the device 200 may comprise a housing 210 and a valve 240. The housing may comprise a wall 214 defining an interior volume 211, a first end 212, a second end 213, a first cap 218, a second cap 250, and an applicator 213. The valve 240 may comprise a valve body 241, the valve body 241 may comprise, a valve first side 248, a valve second side 249, a valve body circumferential outer edge 247 defining a valve outer edge circumference, a first valve positioning member 242, a second valve positioning member 244, and a valve stand 260. The applicator 213 may include one or more passages 219 that may be used to dispense the hair coloring chemicals from device 200. The applicator 213 may include a brush portion 217. The first cap 218 may be used to cover the applicator 213 when not in use.

The circumferential valve outer edge 247 may extend between the valve first side 248 and the valve second side 249, the valve outer edge 247 defining a valve outer edge circumference. The first valve positioning member 242 may protrude from the first side 248. The first valve positioning member 242 may have a first valve positioning member first position 245a when no external forces are acting upon the first valve positioning member 242. At least a portion of the first valve positioning member 242 may extend outside of the valve outer edge 247 circumference when the first valve positioning member 242 is in the first valve positioning member first position 245a.

The second valve positioning member 244 may protrude from the second side 249. The second valve positioning member 244 may have a second valve positioning member first position 245b when no external forces are acting upon the second valve positioning member 244. At least a portion of the second valve positioning member 244 may extends outside of the valve outer edge 247 circumference when the second valve positioning member 244 is in the second valve positioning member first position 245b.

The device 200 may contain two or more liquids, such as hair coloring chemicals in one non-limiting example, at least one in the first interior portion 220 within the housing 210, and at least another in the second interior portion 230 of the housing 210, with the valve 240 therebetween. The valve 240 may be articulated by external manipulation of the housing 210 in a region of the valve 240 causing rotation of the valve 240 from the closed position 246 to the open position 245, and the first valve positioning member 242 may move to the first valve positioning member first position 245a, and the second valve positioning member 244 may move to the second valve positioning member first position 245b.

The valve 240 may include a valve stand 260 disposed adjacent the valve body 241 and constructed and arranged to allow rotation of the valve body with respect to the valve stand 260, as illustrated in FIGS. 4-6. The valve stand 260 may aid in the placement of valve 240 inside of housing 210. For example, the valve stand 260 may aid in positioning the longitudinal axis of valve 240 at the desired angle, for example 45 degrees in one embodiment, from the longitudinal axis of the housing 210 by means of a tab 252 extending from the valve stand 260. The valve stand 260 may also aid in determining the location of the valve 240 along the longitudinal axis of the housing 210 by virtue of a longitudinal length of the valve stand 260. The valve stand 260 may or may not aid in moving valve 240 from closed position 246 (FIG. 5) into open position 245 (FIG. 6). In one embodiment, the valve stand 260 may be installed into housing 210 with the following steps: (1) a first chemical is put into housing 210, occupying the first interior portion 220; (2) the valve 240 is inserted into housing 210 with first valve positioning member 242 and second valve positioning member 244 in first position 245, with the valve 240 seating against wall 214; (3) the valve stand 260 may then be inserted into housing 210 interfacing with valve 240, to position and secure valve 240 in the first position 245; (4) a second chemical is put into housing 210, occupying the second interior portion 230; and (4) the housing 210 is sealed with second cap 250 on an end opposite the applicator 213. Use of the device 200 is the same as described hereinabove with respect to the device 100.

While the detailed description elaborates workable embodiments of the present invention, the embodiments shall not be construed as a limitation on the patented scope and claims of the present invention and, furthermore, all equivalent adaptations and modifications based on the technological spirit of the present invention shall remain protected within the scope and claims of the invention herein.

What is claimed is:

1. A device constructed and arranged for selectively storing and mixing a first liquid and a second liquid, the device comprising:
   a housing comprising a wall defining an interior volume;
   a valve, comprising:
      a valve body comprising a circumferential valve outer edge extending between a valve first side and a valve second side, the valve outer edge defining a valve outer edge circumference;
      a first valve positioning member protruding from the first side, the first valve positioning member having a first valve positioning member first position when no external forces are acting upon the first valve positioning member, wherein at least a portion of the first valve positioning member extends outside of the valve outer edge circumference when the first valve positioning member is in the first valve positioning member first position; and
      a second valve positioning member protruding from the second side, the second valve positioning member having a second valve positioning member first position when no external forces are acting upon the second valve positioning member, wherein at least a portion of the second valve positioning member extends outside of the valve outer edge circumference when the second valve positioning member is in the second valve positioning member first position;
   wherein the valve is positioned within the interior volume inside of the housing and is constructed and arranged to rotate from a closed position in which the valve outer edge seats against the wall along the entire valve outer edge circumference, and an open position in which at least a portion of the valve outer edge is not in contact with the wall;
   wherein in the closed position the valve defines a first interior portion within the interior volume adjacent the first side of the valve, and a second interior portion within the interior volume adjacent the second side of the valve;
   wherein in the closed position, interaction between the wall and the first valve positioning member causes the first valve positioning member to move to a first valve positioning member second position, wherein when in the first valve positioning member second position, the first valve positioning member exerts a first force upon the wall while trying to return to the first valve positioning member first position;
   wherein in the closed position, interaction between the wall and the second valve positioning member causes the second valve positioning member to move to a second valve positioning member second position, wherein when in the second valve positioning member second position, the second valve positioning member exerts a second force upon the wall while trying to return to the second valve positioning member first position;

wherein while in the closed position, the valve is constructed and arranged such that external manipulation of the housing in a region of the valve causes rotation of the valve from the closed position to the open position, and the first valve positioning member moves to the first valve positioning member first position, and the second valve positioning member moves to the second valve positioning member first position.

2. The device of claim 1, wherein the first liquid is disposed in the first interior portion and the second liquid is disposed in the second interior portion when the valve is in the closed position, thereby preventing mixing of the first and second liquids.

3. The device of claim 1, wherein the first and second liquids comprise hair coloring chemicals.

4. The device of claim 1, wherein the first and second valve positioning members comprise springs.

5. The device of claim 1, wherein the first and second valve positioning members urge the valve away from returning to the closed position after being moved to the open positon.

6. The device of claim 1, wherein the valve, the first valve positioning member and the second valve positioning member are formed from a polypropylene and thermoplastic elastomer blend.

7. The device of claim 1, wherein the valve in the closed position prevents the first liquid inside the first interior portion from mixing with the second liquid inside the second interior portion, and wherein the valve in the open position allows the first liquid in the first interior portion to mix with the second liquid in the second interior portion.

8. The device of claim 1, wherein the valve in the closed positon forms a seal between the valve outer edge circumference of the valve body and the wall defining the interior portions of the housing, thus preventing mixing of the first and second liquids.

9. The device of claim 3, wherein the first hair coloring chemical is a developer or oxidizing agent and the second hair coloring chemical is a color.

10. The device of claim 1, wherein the device further comprises an applicator removably attached to the housing.

11. The device of claim 1, wherein the valve comprises a cylindrical segment of a cylinder, the cylindrical segment bounded by two parallel planes angled a number of degrees from the axis of the cylinder.

12. The device of claim 11, wherein the number of degrees comprises 45 degrees.

13. The device of claim 1, wherein said external manipulation comprises squeezing the housing.

14. The device of claim 1, further comprising a valve stand disposed adjacent the valve body and constructed and arranged to allow rotation of the valve body with respect to the valve stand.

15. An apparatus, the apparatus comprising:
a valve, comprising:
a valve body comprising a circumferential valve outer edge extending between a valve first side and a valve second side, the valve outer edge defining a valve outer edge circumference;
a first valve positioning member protruding from the first side, the first valve positioning member having a first valve positioning member first position when no external forces are acting upon the first valve positioning member, wherein at least a portion of the first valve positioning member extends outside of the valve outer edge circumference when the first valve positioning member is in the first valve positioning member first position; and a second valve positioning member protruding from the second side, the second valve positioning member having a second valve positioning member first position when no external forces are acting upon the second valve positioning member, wherein at least a portion of the second valve positioning member extends outside of the valve outer edge circumference when the second valve positioning member is in the second valve positioning member first position.

16. The apparatus of claim 15, further comprising:

a housing comprising a wall defining an interior volume;

wherein the valve is positioned within the interior volume inside of the housing and is constructed and arranged to rotate from a closed position in which the valve outer edge seats against the wall along the entire valve outer edge circumference, and an open position in which at least a portion of the valve outer edge is not in contact with the wall;

wherein in the closed position the valve defines a first interior portion within the interior volume adjacent the first side of the valve, and a second interior portion within the interior volume adjacent the second side of the valve;

wherein in the closed position, interaction between the wall and the first valve positioning member causes the first valve positioning member to move to a first valve positioning member second position, wherein when in the first valve positioning member second position, the first valve positioning member exerts a first force upon the wall while trying to return to the first valve positioning member first position;

wherein in the closed position, interaction between the wall and the second valve positioning member causes the second valve positioning member to move to a second valve positioning member second position, wherein when in the second valve positioning member second position, the second valve positioning member exerts a second force upon the wall while trying to return to the second valve positioning member first position;

wherein while in the closed position, the valve is constructed and arranged such that external manipulation of the housing in a region of the valve causes rotation of the valve from the closed position to the open position, and the first valve positioning member moves to the first valve positioning member first position, and the second valve positioning member moves to the second valve positioning member first position.

17. The apparatus of claim 16, wherein a first liquid is disposed in the first interior portion and a second liquid is disposed in the second interior portion when the valve is in the closed position, thereby preventing mixing of the first and second liquids.

18. The apparatus of claim 17, wherein the first and second liquids comprise hair coloring chemicals.

19. The apparatus of claim 15, wherein the first and second valve positioning members comprise springs.

20. The apparatus of claim 16, wherein the first and second valve positioning members urge the valve away from returning to the closed position after being moved to the open positon.

21. The apparatus of claim 15, wherein the valve, the first valve positioning member and the second valve positioning member are formed from a polypropylene and thermoplastic elastomer blend.

22. The apparatus of claim 17, wherein the valve in the closed position prevents the first liquid inside the first interior portion from mixing with the second liquid inside the second interior portion, and wherein the valve in the open position allows the first liquid in the first interior portion to mix with the second liquid in the second interior portion.

23. The apparatus of claim 16, wherein the valve in the closed positon forms a seal between the valve outer edge circumference of the valve body and the wall defining the interior portions of the housing, thus preventing mixing of the first and second liquids.

24. The apparatus of claim 18, wherein the first hair coloring chemical is a developer or oxidizing agent and the second hair coloring chemical is a color.

25. The apparatus of claim 16, further comprising an applicator removably attached to the housing.

26. The apparatus of claim 15, wherein the valve comprises a cylindrical segment of a cylinder, the cylindrical segment bounded by two parallel planes angled a number of degrees from the axis of the cylinder.

27. The apparatus of claim 26, wherein the number of degrees comprises 45 degrees.

28. The apparatus of claim 16, wherein said external manipulation comprises squeezing the housing.

29. The apparatus of claim 15, further comprising a valve stand disposed adjacent the valve body and constructed and arranged to allow rotation of the valve body with respect to the valve stand.

* * * * *